(12) United States Patent
Bae et al.

(10) Patent No.: US 9,182,640 B2
(45) Date of Patent: Nov. 10, 2015

(54) DISPLAY APPARATUS AND METHOD OF MANUFACTURING THE SAME

(75) Inventors: Yangho Bae, Seoul (KR); Osung Seo, Seoul (KR); Je Hyeong Park, Hwaseong-si (KR); Sanggab Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 1014 days.

(21) Appl. No.: 13/244,150

(22) Filed: Sep. 23, 2011

(65) Prior Publication Data

US 2012/0138938 A1    Jun. 7, 2012

(30) Foreign Application Priority Data

Dec. 2, 2010    (KR) .................. 10-2010-0122279

(51) Int. Cl.
| | | |
|---|---|---|
| *G02F 1/136* | (2006.01) | |
| *G02F 1/1343* | (2006.01) | |
| *G02F 1/1362* | (2006.01) | |

(52) U.S. Cl.
CPC ...... *G02F 1/13439* (2013.01); *G02F 1/136286* (2013.01); *G02F 2001/13629* (2013.01); *G02F 2001/136295* (2013.01)

(58) Field of Classification Search
CPC .......... G02F 1/13439; G02F 1/136286; G02F 2001/13629; G02F 2001/136295
USPC ..................................................... 349/43, 141
See application file for complete search history.

(56) References Cited

U.S. PATENT DOCUMENTS

| | | | | |
|---|---|---|---|---|
| 6,226,061 B1 * | 5/2001 | Tagusa | ............................ | 349/84 |
| 6,411,357 B1 * | 6/2002 | Ting et al. | ..................... | 349/141 |
| 7,196,748 B2 * | 3/2007 | Chae | ................................ | 349/43 |
| 7,391,483 B2 * | 6/2008 | Kawasaki | ....................... | 349/43 |
| 2007/0013842 A1 | 1/2007 | Yang et al. | | |

FOREIGN PATENT DOCUMENTS

| | | |
|---|---|---|
| CN | 1711495 A | 12/2005 |
| CN | 101144952 A | 3/2008 |
| JP | 02-189523 | 7/1990 |
| JP | 06-018925 | 1/1994 |
| JP | 06-160877 | 6/1994 |
| JP | 2003-228081 | 8/2003 |
| JP | 2007-248892 | 9/2007 |
| JP | 2009-059834 | 3/2009 |
| JP | 2009-277640 | 11/2009 |
| KR | 10-2001-0111841 A | 12/2001 |
| KR | 1020060072743 A | 6/2006 |
| KR | 1020080050679 A | 6/2008 |

* cited by examiner

*Primary Examiner* — James Dudek
(74) *Attorney, Agent, or Firm* — Innovation Counsel LLP

(57) ABSTRACT

A display apparatus includes a first insulating substrate on which pixels are arranged and a second insulating substrate facing the first insulating substrate. Each pixel includes a gate electrode disposed on the first insulating substrate, a gate insulating layer disposed on the first insulating substrate to cover the gate electrode, a semiconductor pattern disposed on the gate insulating layer to overlap with the gate electrode, a source electrode and a drain electrode disposed on the semiconductor pattern, a transparent pixel electrode disposed on the gate insulating layer and partially making contact with the drain electrode, a protective layer disposed on the pixel electrode, and a common electrode disposed on the first insulating substrate or the second insulating substrate to form an electric field together with the pixel electrode.

10 Claims, 14 Drawing Sheets

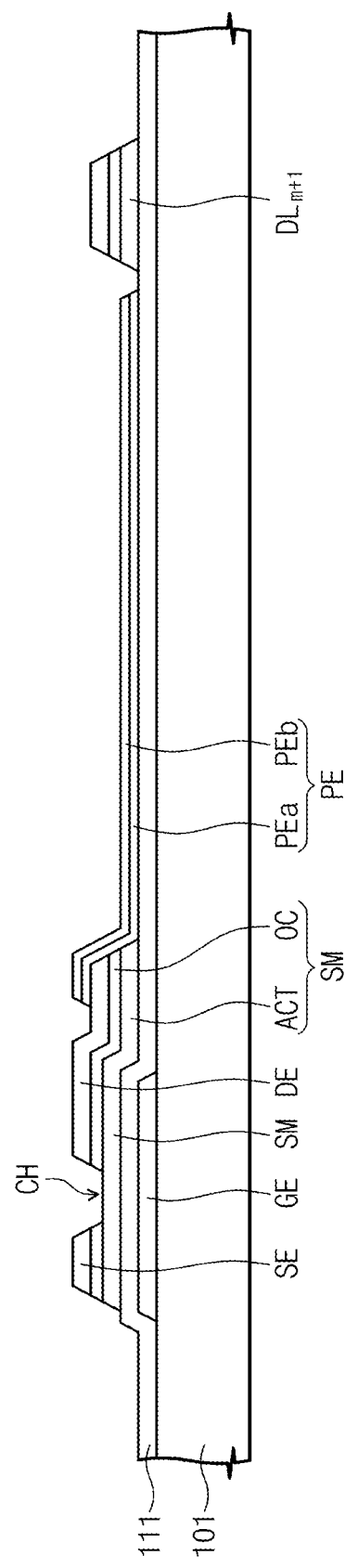

DISPLAY APPARATUS AND METHOD OF MANUFACTURING THE SAME

CROSS-REFERENCE TO RELATED APPLICATION

This application relies for priority upon Korean Patent Application No. 10-2010-0122279 filed on Dec. 2, 2010, the content of which is herein incorporated by reference in its entirety.

BACKGROUND

1. Field of Disclosure

The present invention relates to a display apparatus and a method of manufacturing the display apparatus.

2. Description of the Related Art

In general, liquid crystal displays are classified into in-plane switching (IPS) mode liquid crystal displays, vertical alignment (VA) mode liquid crystal displays, and plane-to-line switching (PLS) mode liquid crystal displays according to the driving method for a liquid crystal layer.

The PLS mode liquid crystal display drives the liquid crystal molecules in the liquid crystal layer using a horizontal electric field and a vertical electrical field. According to the PLS mode liquid crystal display, the liquid crystal molecules in the liquid crystal layer are rotated substantially in parallel to a substrate by a fringe electric field.

SUMMARY

Embodiments of the present invention provide a display apparatus having an improved display quality.

Embodiments of the present invention provide a method of manufacturing the display apparatus.

According to the embodiments, a display apparatus includes a first insulating substrate, a second insulating substrate facing the first insulating substrate, and a plurality of pixels disposed on the first insulating substrate.

Each pixel includes a thin film transistor, a pixel electrode, a protective layer, and a common electrode. The thin film transistor includes a gate electrode, a gate insulating layer, a semiconductor pattern, a source electrode, and a drain electrode.

The gate electrode is disposed on the first insulating substrate. The gate insulating layer is disposed on the first insulating substrate to cover the gate electrode. The semiconductor pattern is disposed on the gate insulating layer to overlap with the gate electrode. The source electrode is disposed on the semiconductor pattern and the drain electrode is disposed on the semiconductor pattern to be spaced apart from the source electrode.

A transparent pixel electrode includes a first pixel electrode and a second pixel electrode. The first pixel electrode is disposed on the gate insulating layer and partially makes contact with the drain electrode. The second pixel electrode covers the first pixel electrode.

The common electrode is disposed on the first insulating substrate or the second insulating substrate to form an electric field together with the pixel electrode. The first pixel electrode includes a conductive metal oxide layer containing at least indium and the second pixel electrode includes a conductive metal oxide layer not containing the indium.

The first pixel electrode and the second pixel electrode may include at least one of tin or zinc. Each of the source electrode and the drain electrode may have a single-layer structure or a multi-layer structure comprising nickel, chromium, molybdenum, aluminum, titanium, copper, tungsten, or an alloy thereof.

The common electrode may include a main branch portion and a plurality of sub-branch portions protruded from the main branch portion and spaced apart from each other. The common electrode is disposed between the first insulating substrate and the gate insulating layer and insulated from the gate electrode, or the common electrode is disposed on the second insulating substrate.

According to the embodiments, a method of manufacturing a display apparatus is provided as follows. A first conductive layer is formed on a first insulating substrate and the first conductive layer is patterned to form a gate electrode. A gate insulating layer is formed on the first insulating substrate to cover the gate electrode. A semiconductor material and a second conductive layer are sequentially formed on the gate insulating layer, and the semiconductor material and the second conductive layer are patterned to form a semiconductor pattern, a source electrode, and a drain electrode. The source and drain electrodes are formed on the semiconductor pattern and spaced apart from each other to expose a portion of the semiconductor pattern. A first transparent conductive metal oxide layer and a second transparent conductive metal oxide layer are sequentially formed on the gate insulating layer, and the first and second transparent conductive metal oxide layers are patterned to expose the portion of the semiconductor pattern and to form a pixel electrode connected to the drain electrode. The first insulating substrate is plasma-treated with a plasma containing a hydrogen source or a plasma containing a hydrogen and nitrogen source. A protective layer is formed to cover the pixel electrode. The first conductive metal oxide layer includes a conductive metal oxide layer containing at least indium and the second conductive metal oxide layer includes a conductive metal oxide layer not containing the indium.

According to the above, a defect that causes haziness in images may be prevented from occurring on the pixel electrode when the pixel electrode is plasma-treated. Thus, the display apparatus may have high transmittance.

BRIEF DESCRIPTION OF THE DRAWINGS

The above and other advantages of the present invention will become readily apparent by reference to the following detailed description when considered in conjunction with the accompanying drawings wherein:

FIG. 5B is a cross-sectional view taken along a line I-I' shown in FIG. 5A;

DETAILED DESCRIPTION

Figure 1:
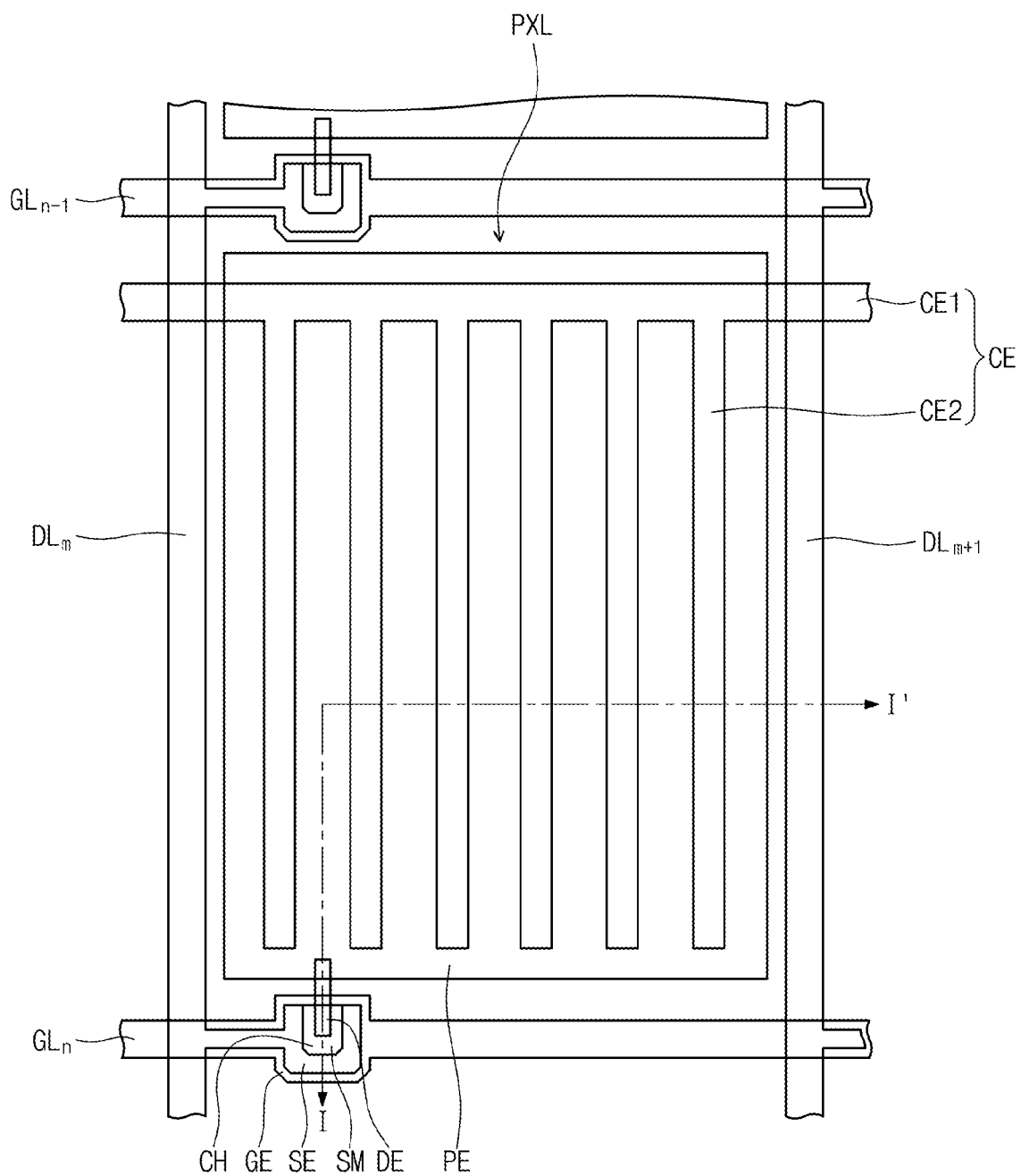
FIG. 1 is a plan view showing a portion of a display apparatus manufactured by a manufacturing method of the display apparatus according to a first embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
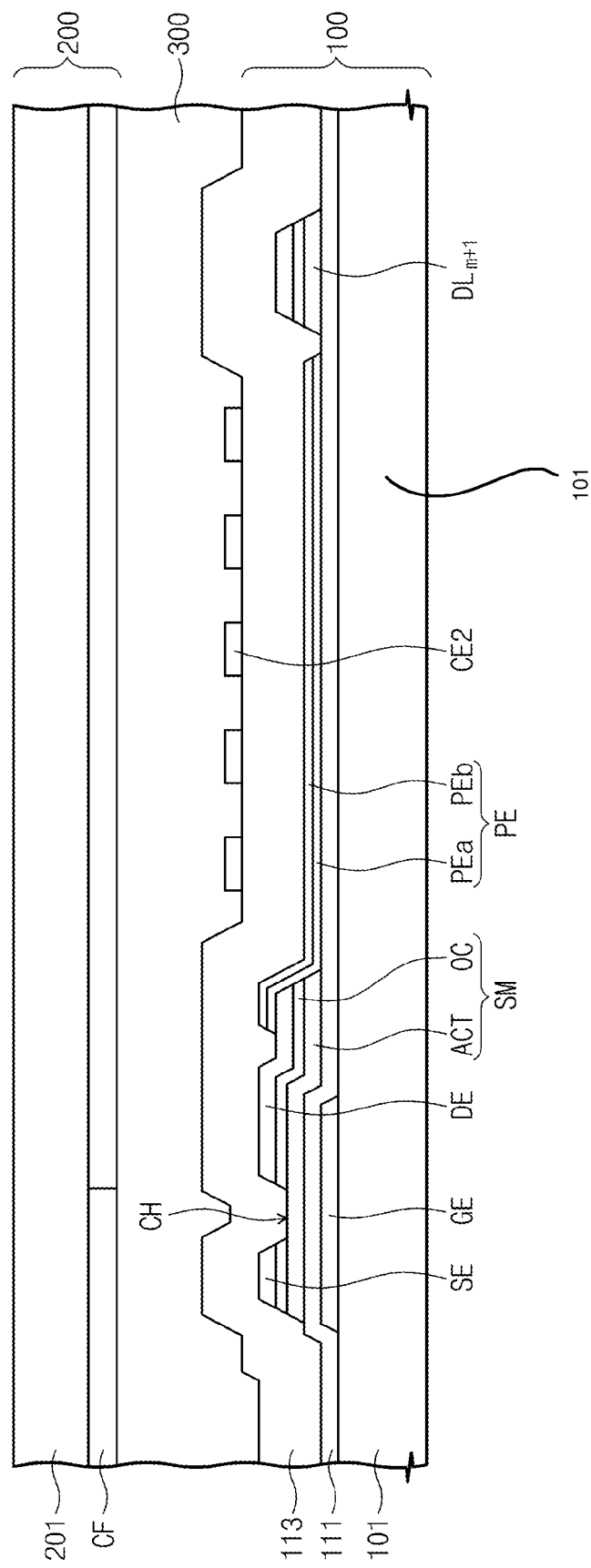
FIG. 2 is a cross-sectional view taken along a line I-I' shown in FIG. 1.

FIG. 1 is a plan view showing a portion of a display apparatus manufactured by a manufacturing method of the display apparatus according to a first embodiment of the present invention, and FIG. 2 is a cross-sectional view taken along a line I-I' shown in FIG. 1. Hereinafter, for the convenience of explanation, the display apparatus manufactured by the manufacturing method according to the first embodiment will be described, and then the manufacturing method according to the first embodiment will be described.

Referring to FIGS. 1 and 2, the display apparatus includes a first substrate 100, a second substrate 200 facing the first substrate 100, and a liquid crystal layer 300 disposed between the first substrate 100 and the second substrate 200. The first substrate 100 is referred to as a thin film transistor substrate since thin film transistors are formed on the first substrate 100, and the second substrate 200 is referred to as a color filter substrate since color filters CF are formed on the second substrate 200.

The first substrate 100 includes a first insulating substrate 101, a plurality of gate lines, a plurality of data lines, and a plurality of pixels PXL. The first insulating substrate 101 has a rectangular shape and includes a transparent insulating material.

The gate lines are formed on the first insulating substrate 101 and extend in a first direction. The gate lines include (n+p) gate lines GL1, . . . , GLn, GLn+1, . . . , GL(n+p−1), and GLn+p.

The data lines are disposed on the gate lines with an insulating layer between them and extend in a second direction crossing the first direction. The data lines includes (m+q) data lines DL1, . . . , DLm, DLm+1, . . . , DL(m+q−1), DLm+q. Each pixel is connected to one of the gate lines GL1, . . . , GLn, GLn+1, . . . , GL(n+p−1), and GLn+p and one of the data lines DL1, . . . , DLm, DLm+1, . . . , DL(m+q−1), DLm+q.

The pixels PXL have the same structure and function. So, for convenience of explanation, n-th gate line GLn, m-th data line DLm, and one pixel PXL are shown in FIG. 1.

Each pixel PXL includes a thin film transistor, a pixel electrode PE connected to the thin film transistor, a protective layer 113 covering the pixel electrode PE, and a common electrode CE separated from the pixel electrode PE. The thin film transistor includes a gate electrode GE, a gate insulating layer 111, a semiconductor pattern SM, a source electrode SE, and a drain electrode DE.

The gate electrode GE protrudes from the n-th gate line GLn such that it forms a portion that is wider than the other parts of the n-th gate line GLn.

The gate electrode GE may be formed of a metal such as nickel, chromium, molybdenum, aluminum, titanium, copper, tungsten, and an alloy thereof. The gate electrode GE may have a single-layer structure or a multi-layer structure. For instance, the gate electrode GE may have a triple-layer structure including molybdenum, aluminum, and molybdenum that are sequentially stacked, a double-layer structure of titanium and copper, or a single-layer structure of an alloy of titanium and copper.

The gate insulating layer 111 is disposed on the first insulating substrate 101 and covers the n-th gate line GLn.

The semiconductor pattern SM is disposed on the gate insulating layer 111. The semiconductor SM partially overlaps with the gate electrode GE in plan view. The semiconductor pattern SM includes an active pattern ACT disposed on the gate insulating layer 111 and an ohmic contact layer OC disposed on the active pattern ACT. The active pattern ACT may be an amorphous silicon thin layer and the ohmic contact layer OC may be an n+ amorphous silicon thin layer. The ohmic contact layer OC is provided between a portion of the active pattern ACT and the source electrode SE and between a portion of the active pattern ACT and the drain electrode DE. The ohmic contact layer OC provides ohmic contacts between the active pattern ACT and the source electrode SE and between the active pattern ACT and the drain electrode DE.

The source electrode SE branches from the m-th data line DLm. The source electrode SE is disposed on the ohmic contact layer with a portion of it overlapping the gate electrode GE.

The drain electrode DE is spaced apart from the source electrode SE. The semiconductor pattern SM extends from under the source electrode SE to under the drain electrode DE. The drain electrode DE is disposed on the ohmic contact layer OC and a portion of it overlaps the gate electrode GE.

The source electrode SE and the drain electrode DE may include nickel, chromium, molybdenum, aluminum, titanium, copper, tungsten, and an alloy thereof. Each of the source electrode SE and the drain electrode DE may have a single-layer structure or a multi-layer structure. For instance, each of the source electrode SE and the drain electrode DE may have a double-layer structure of titanium and copper stacked one on the other or a single-layer structure of an alloy of titanium and copper.

The source electrode SE and the drain electrode DE are spaced apart from each other by a predetermined distance on the semiconductor pattern SM. Accordingly, an upper surface of the active pattern ACT corresponding to the area between the source electrode SE and the drain electrode DE is not covered by either of the electrodes SE, DE. This region of the active pattern ACT that is not covered by the electrodes SE, DE serves as a channel region CH in which a conductive channel is formed between the source electrode SE and the drain electrode DE when a voltage is applied to the gate electrode GE.

The pixel electrode PE is disposed on the drain electrode DE and the gate insulating layer 111. The pixel electrode PE is provided on the gate insulating layer 111 and on a portion of the drain electrode DE to directly make contact with the gate insulating layer 111 and the portion of the drain electrode DE.

In the particular embodiment that is shown, the pixel electrode PE has a rectangular shape in plan view, but this is not a limitation of the invention. The pixel electrode PE is formed as a single piece without an opening.

The pixel electrode PE includes a first pixel electrode PEa and a second pixel electrode PEb when viewed in a cross-sectional view. The first pixel electrode PEa is disposed on the drain electrode DE and the gate insulating layer 111 to directly make contact with the drain electrode DE and the gate insulating layer 111. The second pixel electrode PEb is disposed on the first pixel electrode PEa to cover the first pixel electrode PEa. The first pixel electrode PEa is formed of a transparent conductive material. In detail, the first pixel electrode PEa includes a transparent conductive oxide such as indium tin oxide, indium zinc oxide, or indium tin zinc oxide.

The second pixel electrode PEb includes a transparent conductive oxide that does not include indium. The second pixel electrode PEb may include tin oxide or zinc oxide. The second pixel electrode PEb may include tin oxide doped with an impurity, i.e., a dopant, or a zinc oxide doped with an impurity. The impurity may be aluminum, germanium, gallium, or a mixture thereof. The concentration of the impurity to tin oxide or zinc oxide contained in the second pixel electrode PEb is approximately 5 weight percent (wt %) or less of the tin or zinc oxide. If the concentration of the impurity increases in excess of the above ratio, e.g., 5 weight percent (wt %), the pixel electrode PEb is difficult to be doped effectively.

The first pixel electrode PEa has the same size as the second pixel electrode PEb in plan view and overlaps the second pixel electrode PEb.

The first pixel electrode PEa is thinner than the second pixel electrode PEb. The second pixel electrode PEb has an electric resistance lower than the first pixel electrode PEa. Thus, in order to sufficiently apply a voltage to the pixel electrode PE to drive the liquid crystal layer 300, the second pixel electrode PEb is thicker than the first pixel electrode PEa.

The protective layer 113 is disposed on the pixel electrode PE. The protective layer 113 covers the channel region CH and the pixel electrode PE. The protective layer 113 includes silicon nitride (SiNx).

The common electrode CE is formed on the protective layer 113. The common electrode CE may be formed of a transparent conductive material. Particularly, the common electrode CE may be formed of a conductive metal oxide such as indium tin oxide, indium zinc oxide, or indium tin zinc oxide.

The common electrode CE includes a main branch portion CE1 formed in each pixel PXL and sub-branch portions CE2 extending from the main branch portion CE1. The main branch portion CE1 in each pixel PXL extends to the main branch portion CE1 or the sub-branch portions CE2 in an adjacent pixel PXL to be connected to the main branch portion CE1 in the adjacent pixel PXL or one of the sub-branch portions CE2 in the adjacent pixel PXL. Thus, the common electrode CE may receive a uniform voltage independently of the pixels PXL.

The sub-branch portions CE2 are spaced apart from each other by a uniform distance. The sub-branch portions CE2 extend in a predetermined direction to be substantially parallel to each other. In the present embodiment, the sub-branch portions CE2 extend from the main branch portion CE1 in a predetermined direction, but they should not be limited thereto. That is, the main branch portion CE1 and the sub-branch portions CE2 may have other shapes. For instance, the sub-branch portions CE2 may protrude upward or downward from the main branch portion CE1, or the main branch portion CE1 may form a loop or may be bent at one or more places.

The second substrate 200 includes a second insulating substrate 201 and color filters CF. The color filters CF provide colors to light passing through the liquid crystal layer 300. The color filters CF include a red color filter, a green color filter, and a blue color filter. The red color filter, the green color filter, and the blue color filter may be arranged in the pixels PXL such that there is one color filter per pixel PXL.

The liquid crystal layer 300 including liquid crystal molecules is provided between the first substrate 100 and the second substrate 200.

In the display apparatus, when a gate signal is applied to the n-th gate line GLn, the thin film transistor connected to the n-th gate line GLn is turned on. Accordingly, the data signal applied to the m-th data line DLm is applied to the pixel electrode PE through the turned-on thin film transistor. When the data signal is applied to the pixel electrode PE, an electric field is generated between the pixel electrode PE and the common electrode CE. The voltage applied to the pixel electrode PE is different than the voltage applied to the common electrode CE. For instance, when the voltage of about zero volts is applied to the common electrode CE, the voltage of about 7 volts may be applied to the pixel electrode PE. The liquid crystal molecules are driven by the electric field that is generated by a difference between the common electrode voltage and the pixel electrode voltage. The amount of light passing through the liquid crystal layer 300 is controlled with this voltage difference, thereby displaying a desired image.

Hereinafter, the method of manufacturing the display apparatus according to the first embodiment of the present invention will be described. Especially, the method of manufacturing the first substrate 100 will be firstly described.

According to the first embodiment of the present invention, the first substrate 100 of the display apparatus may be manufactured through first to fourth photolithography processes using four masks.

Figure 3A:
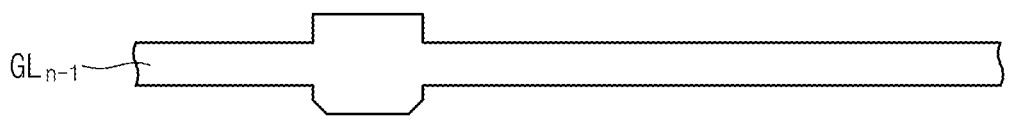
FIG. 3A is a plan view showing a result of a first photolithography process of the manufacturing method according to the first embodiment of the present invention.
Figure 3A:
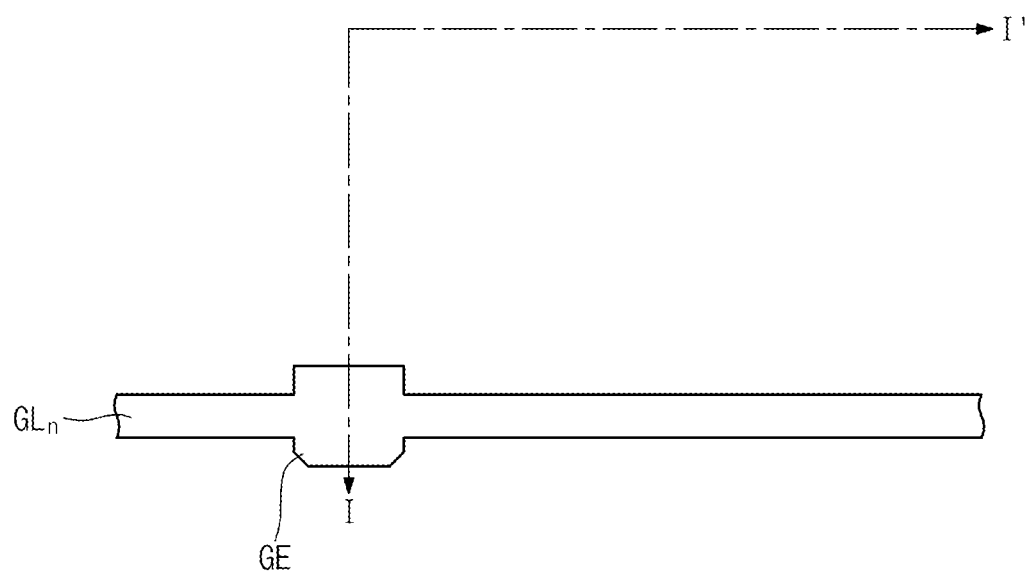
Figure 3B:
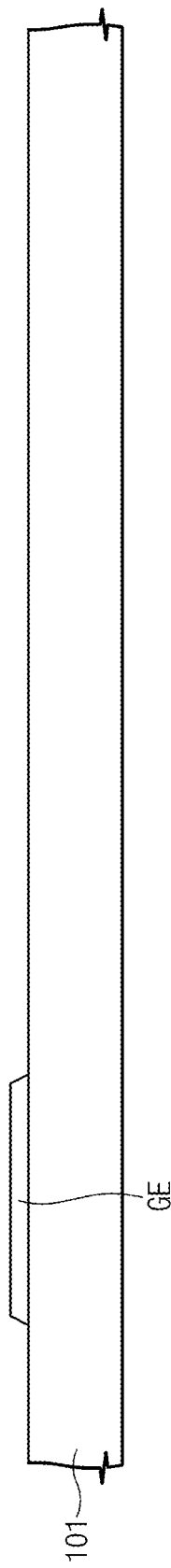
FIG. 3B is a cross-sectional view taken along a line I-I' shown in FIG. 3A.
Figure 4A:
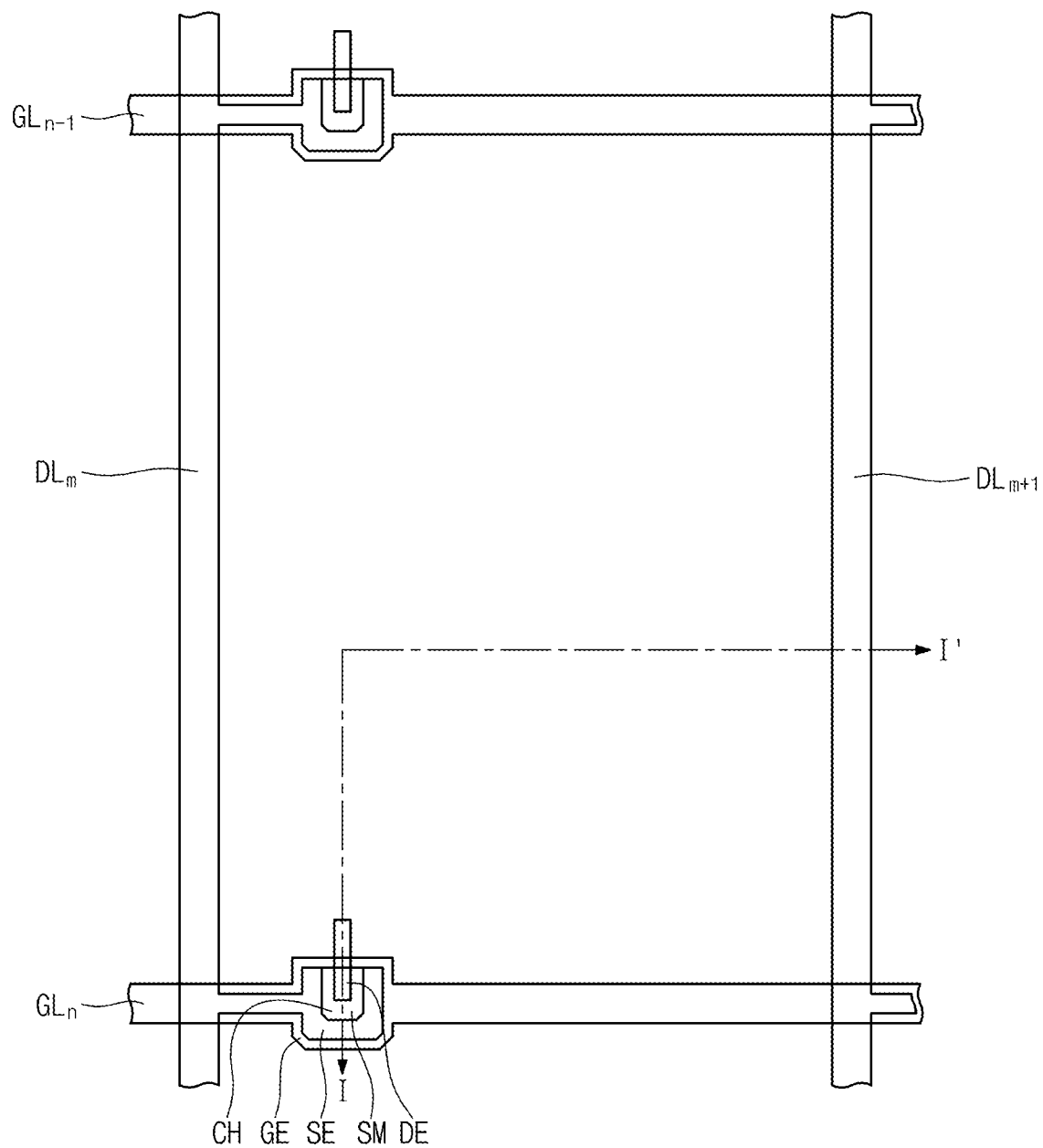
FIG. 4A is a plan view showing a result of a second photolithography process of the manufacturing method according to the second embodiment of the present invention.
Figure 4B:
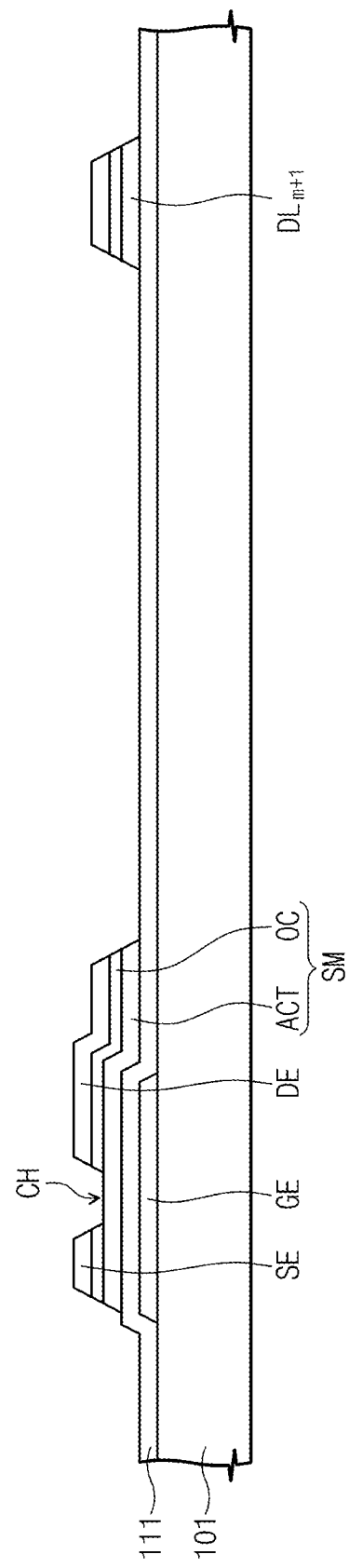
FIG. 4B is a cross-sectional view taken along a line I-I' shown in FIG. 4A.
Figure 5A:
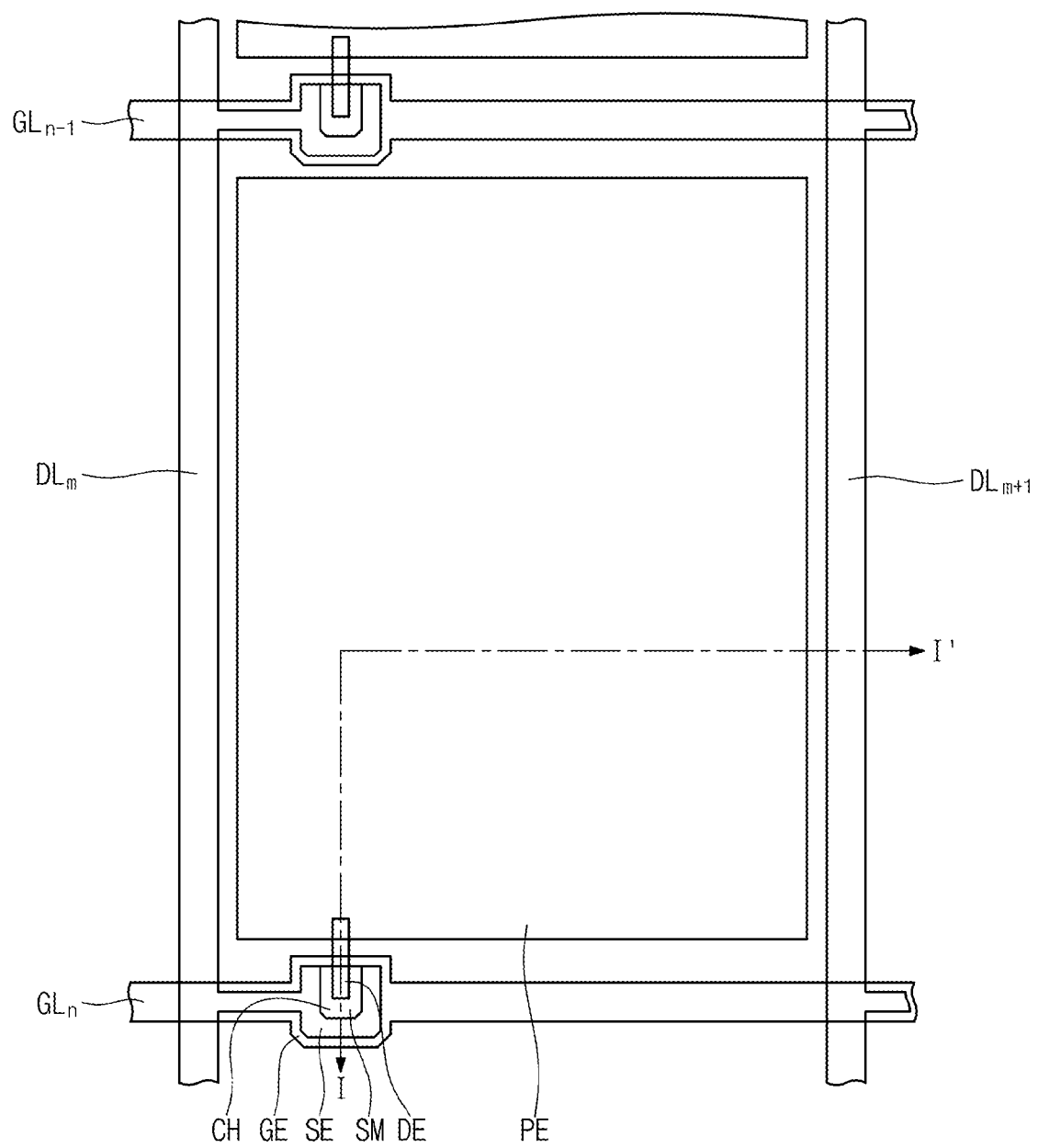
FIG. 5A is a plan view showing a result of a third photolithography process of the manufacturing method according to the third embodiment of the present invention.
Figure 6A:
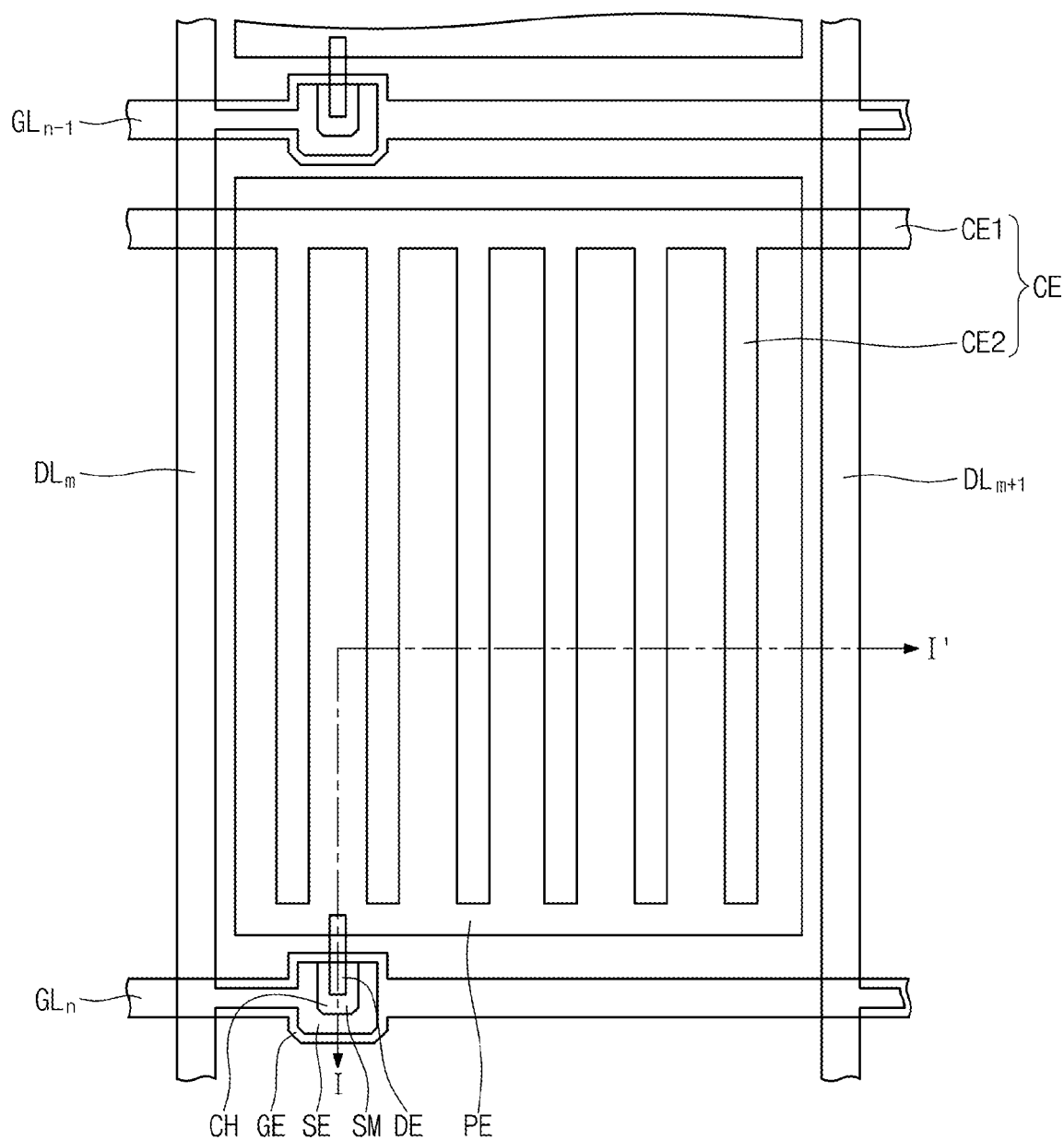
FIG. 6A is a plan view showing a result of a fourth photolithography process of the manufacturing method according to the fourth embodiment of the present invention.
Figure 6B:
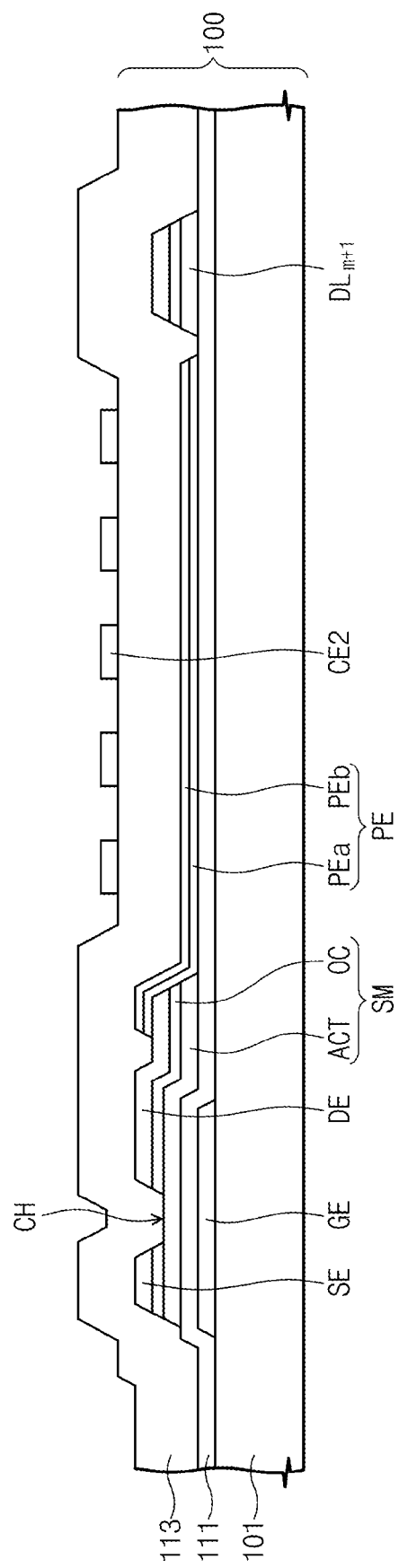
FIG. 6B is a cross-sectional view taken along a line I-I' shown in FIG. 6A.

FIG. 3A is a plan view showing a result of a first photolithography process of the manufacturing method according to the first embodiment of the present invention, FIG. 3B is a cross-sectional view taken along a line I-I' shown in FIG. 3A, FIG. 4A is a plan view showing a result of a second photolithography process of the manufacturing method according to the second embodiment of the present invention, FIG. 4B is a cross-sectional view taken along a line I-I' shown in FIG. 4A, FIG. 5A is a plan view showing a result of a third photolithography process of the manufacturing method according to the third embodiment of the present invention, FIG. 5B is a cross-sectional view taken along a line I-I' shown in FIG. 5A, FIG. 6A is a plan view showing a result of a fourth photolithography process of the manufacturing method according to the fourth embodiment of the present invention, and FIG. 6B is a cross-sectional view taken along a line I-I' shown in FIG. 6A.

Referring to FIGS. 3A and 3B, the n-th gate line GLn and the gate electrode GE are formed by the first photolithography process. To this end, a first conductive layer and a photoresist layer are sequentially formed on the first insulating substrate 101. Then, the photoresist layer is exposed and developed to form a photoresist layer pattern, and the first conductive layer is patterned using the photoresist layer pattern as a mask, thereby forming the n-th gate line GLn and the gate electrode GE.

The first conductive layer may be made of a metal such as nickel, chromium, molybdenum, aluminum, titanium, copper, tungsten, or an alloy thereof. The first conductive layer may have a single-layer structure or a multi-layer structure using the aforementioned metal.

Referring to FIGS. 4A and 4B, the m-th data line DLm, the semiconductor pattern SM including the channel region CH, the source electrode SE, and the drain electrode DE are formed on the first insulating substrate 101 on which the n-th gate line GLn and the gate electrode GE are formed by using the second photolithography process. Before forming the m-th data line DLm, the semiconductor pattern SM including the channel region CH, the source electrode SE, and the drain electrode DE, the gate insulating layer 111 is formed on the first insulating substrate 101 to cover the n-th gate line GLn and the gate electrode GE. The second photolithography process uses a slit mask or a diffraction mask.

Although not shown in FIGS. 4A and 4B, the second photolithography process is as follows.

The gate insulating layer 111, a semiconductor layer, a second conductive layer, and a photoresist layer are sequentially formed on the first insulating substrate 101 on which the n-th gate line GLn and the gate electrode GE are formed to cover the n-th gate line GLn and the gate electrode GE.

The semiconductor layer may be formed by sequentially forming the amorphous silicon layer and the n+ amorphous silicon layer on the gate insulating layer 111. The second conductive layer may have a single-layer structure or a multi-layer structure of nickel, chromium, molybdenum, aluminum, titanium, copper, tungsten, and an alloy thereof. For instance, the second conductive layer may have a double-layer structure of titanium and copper or a single-layer structure of an alloy of titanium and copper.

Then, the photoresist layer is exposed and developed using a slit mask or a diffraction mask. Accordingly, a photoresist layer pattern having different thicknesses according to its position is formed. After that, the second conductive layer, the amorphous silicon layer, and the n+ amorphous silicon layer are selectively etched using the photoresist layer pattern as a mask. Thus, an amorphous silicon pattern, an n+ amorphous silicon pattern, and a second conductive pattern are formed above the gate electrode GE to have substantially the same size.

Then, a portion of the photoresist layer pattern is removed by an ashing process or an etch-back process. When the second conductive pattern and the n+ amorphous silicon layer are removed using the remaining photoresist layer pattern as a mask, the m-th data line, the source electrode SE, and the drain electrode DE are formed, and the channel region CH is exposed between the source electrode SE and the drain electrode DE.

Referring to FIGS. 5A and 5B, the pixel electrode PE is formed on the first insulating substrate 101 by the third photolithography process, on which the m-th data line DLm, the semiconductor layer, the source electrode SE, and the drain electrode DE are formed.

To this end, a first conductive metal oxide layer, a second conductive oxide layer, and a photoresist layer are sequentially formed on the first insulating substrate 101 on which the m-th data line DLm, the semiconductor layer, the source electrode SE, and the drain electrode DE are formed. Then, the photoresist layer is exposed and developed to form the photoresist layer pattern. After that, the first and second conductive metal oxide layers are substantially simultaneously patterned using the photoresist layer pattern as a mask.

The first conductive metal oxide layer may be formed of a transparent conductive metal such as indium tin oxide (ITO), indium zinc oxide (IZO), indium tin zinc oxide (ITZO).

The second conductive metal oxide layer may be formed of a transparent conductive material that does not include indium. For example, the second conductive metal oxide layer may include tin oxide or zinc oxide. The second conductive metal oxide layer may include tin oxide doped with an impurity or zinc oxide doped with an impurity. The impurity may be aluminum, germanium, gallium, or a mixture thereof. The composition ratio of the impurity to tin oxide or zinc oxide contained in the second pixel electrode PEb is approximately 5 weight percent (wt %) or less. If the composition ratio of the impurity exceeds 5 weight percent (wt %) of the tin/zinc oxide, it becomes difficult to dope the pixel electrode PEb effectively.

As a result, the pixel electrode PE is formed on a portion of the drain electrode DE to overlap with the drain electrode DE and contact the gate insulating layer 111.

Then, although not shown in FIGS. 5A and 5B, the first insulating substrate 101 on which the pixel electrode PE is formed is plasma-treated. The plasma-treatment process is performed using hydrogen ($H_2$) or a mixture of hydrogen ($H_2$) and nitrogen ($N_2$). The plasma-treatment process is performed to reduce a dangling bond of silicon in the channel region CH that is exposed. In addition, the plasma-treatment process may be applied to remove contaminants generated during the third photolithography process.

Referring to FIGS. 6A and 6B, the common electrode CE is formed on the first insulating substrate 101 on which the pixel electrode PE is formed after forming the protective layer 113 on the first insulating substrate 101. The common electrode CE is formed by the fourth photolithography process.

In order to form the common electrode CE, the protective layer 113, a transparent conductive material layer, and a photoresist layer are sequentially formed on the first insulating substrate 101 after the pixel electrode PE is formed on the first insulating substrate 101. Then, the photoresist layer is exposed and developed to form a photoresist layer pattern, and the transparent conductive material layer is patterned using the photoresist layer pattern as a mask.

The protective layer 113 is deposited by using a plasma-enhanced chemical vapor deposition (PECVD) process. The PECVD process is performed using silane ($SiH_4$) gas, ammonia ($NH_3$) gas, nitrogen ($N_2$) gas, and hydrogen ($H_2$) gas, and thus the protective layer 113 is formed of silicon nitride (SiNx).

The first substrate 100 manufactured by the above-mentioned processes is coupled with the second substrate 200 on which the color filters CF of FIG. 1 are formed. The liquid crystal layer 300 is formed between the first substrate 100 and the second substrate 200.

As described above, according to the first embodiment, the first substrate 100 may be manufactured by four photolithography processes using four masks, thereby preventing defects due to the reduction of indium. The defects are as follows.

Sometimes, the pixel electrode PE is formed of an indium-containing transparent conductive oxide material. The indium-containing transparent conductive oxide material includes zinc or tin with indium. For instance, indium tin oxide includes approximately 90 weight percent (wt %) indium oxide ($In_2O_3$) and approximately 10 weight percent (wt %) tin oxide (SnO).

Accordingly, when the plasma-treatment process is applied to the channel region CH after the second photolithography process, the indium oxide material reacts with H* during the plasma-treatment process. Thus, the H* is oxidized, and the indium is reduced to be precipitated. A reaction formula for the reaction between the indium and the H* is as the following chemical formula without consideration of coefficients.

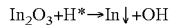
[Chemical formula]

The indium precipitates on the surface of the pixel electrode PE. The precipitation deteriorates the transmittance of the pixel electrode PE, thereby causing a defect in which the image displayed on the display apparatus becomes hazy and less clear. In addition, an electrical conductivity of the pixel electrode PE is lowered by the precipitated indium, so display quality of the display apparatus is deteriorated.

In order to prevent this type of defect, a method that forms a passivation layer including silicon nitride (SiNx) on the channel region CH and etches the passivation layer have been tried. However, the process time and the manufacturing cost are remarkably higher with this technique since the passivation process and the etching process are performed as additional steps.

In addition, the defect may occur not only during the plasma-treatment process after the second photolithography but also during the process of forming the protective layer 113. Since the protective layer 113 is formed of silicon nitride (SiNx), silane ($SiH_4$) gas, ammonia ($NH_3$) gas, nitrogen ($N_2$) gas, and hydrogen ($H_2$) gas are used to form the protective layer 113 using silicon nitride (SiNx) by the PECVD process. Thus, the H* from the hydrogen gas reacts with the indium-containing transparent conductive oxide material as the chemical formula. Accordingly, the defect caused by the precipitation of indium may occur when the protective layer 113 is formed.

However, according to the first embodiment, the pixel electrode PE is formed in a double-layer structure and the exposed portion after the second photolithography process does not contain indium. Thus, although the hydrogen-plasma treatment or the hydrogen-nitrogen-plasma treatment is applied to the pixel electrode PE after the second photolithography process, indium precipitation on the surface of the pixel electrode PE does not occur. In addition, although the plasma-treatment is applied to the pixel electrode PE when forming the protective layer 113, indium does not precipitate on the surface of the pixel electrode PE. Hence, any deterioration in display quality due to the precipitation of the indium is avoided.

In the first embodiment, the PLS mode display apparatus in which the common electrode CE is formed on the pixel electrode PE has been described, but this is not a limitation of the invention. In the second embodiment, the common electrode CE is disposed under the pixel electrode PE and the common electrode CE has a different shape from the pixel electrode PE.

Figure 7:
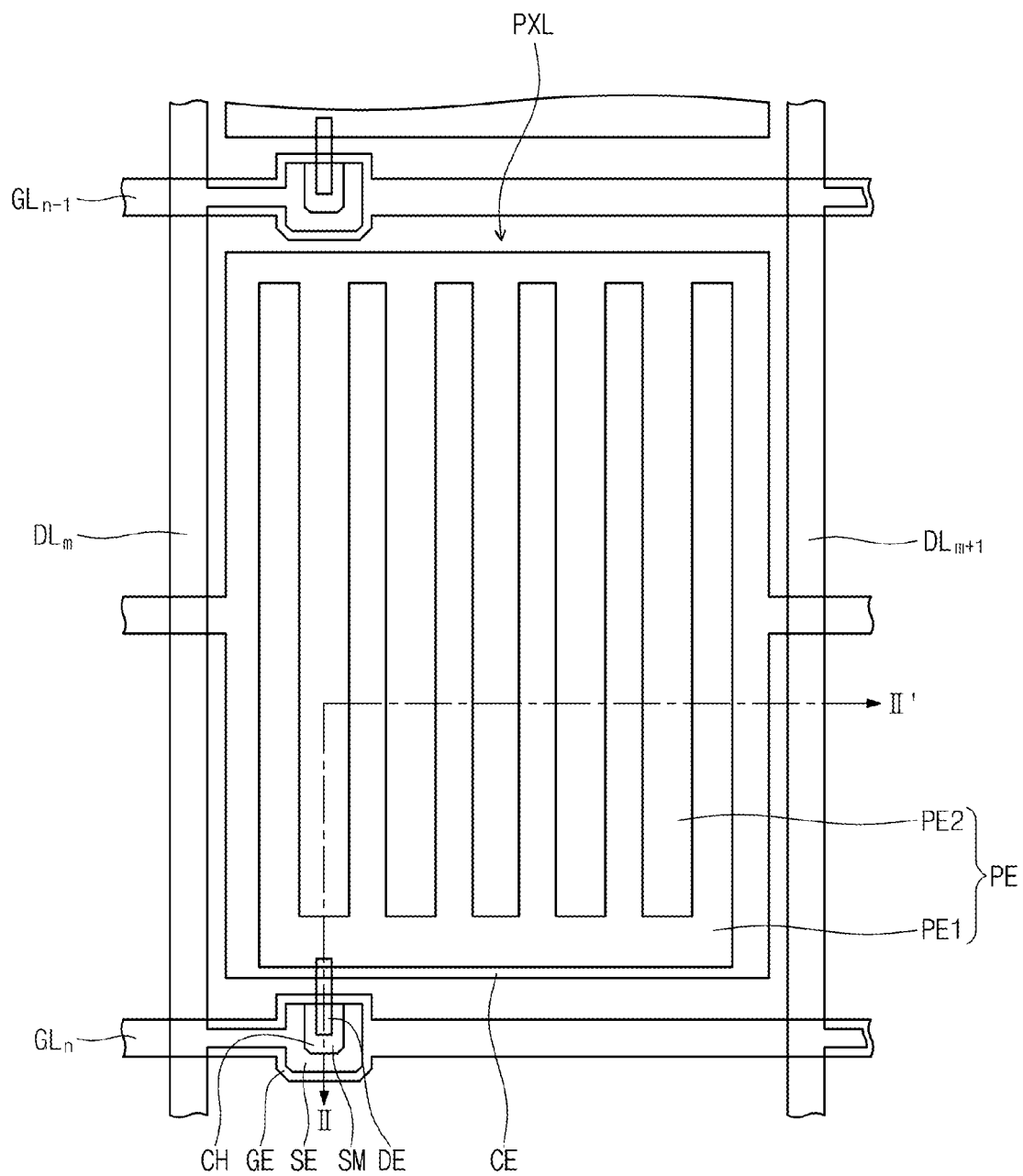
FIG. 7 is a plan view showing a portion of a display apparatus manufactured by a manufacturing method of the display apparatus according to a second embodiment of the present invention.
Figure 8:
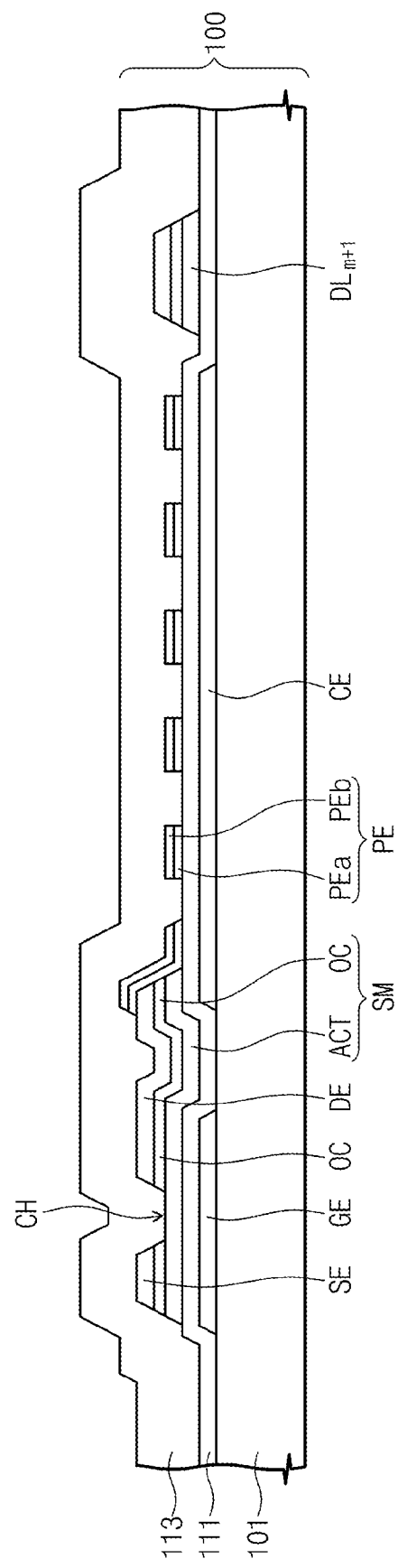
FIG. 8 is a cross-sectional view taken along a line II-II' shown in FIG. 7.

FIG. 7 is a plan view showing a portion of a display apparatus manufactured by a manufacturing method of the display apparatus according to a second embodiment of the present invention, and FIG. 8 is a cross-sectional view taken along a line II-IF shown in FIG. 7. In FIGS. 7 and 8, the same reference numerals denote the same elements in FIGS. 1 and 2, and thus detailed descriptions of the same elements will be omitted.

Referring to FIGS. 7 and 8, a first substrate 100 includes a plurality of gate lines, a plurality of data lines, and a plurality of pixels, each being connected to a corresponding gate line of the gate lines and a corresponding data line of the data lines.

According to the second embodiment, each pixel PXL includes a thin film transistor, a pixel electrode PE connected to the thin film transistor, a protective layer 113 covering the pixel electrode PE, and a common electrode CE spaced apart from the pixel electrode PE. The thin film transistor includes a gate electrode GE, a gate insulating layer 111, a semiconductor pattern SM, a source electrode SE, and a drain electrode DE.

The common electrode CE is disposed on the first insulating substrate 101. The common electrode CE is provided between two gate lines adjacent to each other, e.g., between the (n−1)th gate line GLn−1 and the n-th gate line GLn, when viewed in plan view. The common electrode CE extends to connect to the common electrode CE in an adjacent pixel PXL. Thus, the common electrode CE may receive a uniform voltage independently of the pixels PXL.

The common electrode CE has a rectangular shape in each pixel PXL, but is not limited to being any particular shape. The common electrode CE may have various shapes according to the shape of the pixel PXL. The pixel electrode PE is formed as a single piece without an opening.

The gate insulating layer 111 is disposed on the first insulating substrate 101 to cover the n-th gate line GLn, the gate electrode GE, and the common electrode CE.

The semiconductor pattern SM, the source electrode SE, and the drain electrode DE have substantially the same structure and function as those described in the first embodiment.

The pixel electrode PE includes a main branch portion PE1 formed in each pixel PXL and sub-branch portions PE2 extending from the main branch portion PE1. The sub-branch portions PE2 are spaced apart from each other by a uniform distance. The sub-branch portions PE2 extend in a predetermined direction to be substantially parallel to each other. In the present embodiment, the sub-branch portions PE2 protrude from the main branch portion PE1 in a predetermined direction, although this is not a limitation of the invention. That is, the main branch portion PE1 and the sub-branch portions PE2 may have various shapes. For instance, the sub-branch portions PE2 may protrude upward or downward from the main branch portion PE1, or the main branch portion PE1 may form a loop or bend one or more times.

The protective layer 113 is disposed on the pixel electrode PE to cover the pixel electrode PE.

According to the second embodiment, the first substrate 100 may be manufactured by first to fourth photolithography processes using four masks.

The n-th gate line GLn and the gate electrode GE are formed by the first photolithography process. To this end, a first conductive layer and a photoresist layer are sequentially formed on the first insulating substrate 101. Then, the photoresist layer is exposed and developed to form the photoresist layer pattern, and the first conductive layer is patterned using the photoresist layer pattern as a mask, thereby forming the n-th gate line GLn and the gate electrode GE.

The common electrode CE is formed between the n-th gate line GLn and the (n−1)th gate line GLn−1 by using the second photolithography process. In order to form the common electrode CE, a transparent conductive layer and a photoresist layer are sequentially formed on the first insulating substrate 101. Then, the photoresist layer is exposed and developed to form a photoresist layer pattern. When the transparent conductive layer is patterned using the photoresist layer pattern as a mask, the common electrode CE is formed.

After the gate insulating layer 111 is formed on the first insulating substrate 101 on which the n-th gate line GLn and the gate electrode GE are formed by using the third photolithography process, the m-th data line DLm, the semiconductor pattern SM including the channel region CH, the source electrode SE, and the drain electrode DE are formed on the gate insulating layer 111. The third photolithography process is similar to the second photolithography process described in the first embodiment.

The pixel electrode PE is formed on the first insulating substrate 101, on which the m-th data line DLm, the semiconductor pattern SM, the source electrode SE, and the drain electrode DE are formed by using the fourth photolithography process. In order to form the pixel electrode PE, the first transparent conductive metal oxide layer, the second transparent conductive metal oxide layer, and the photoresist layer are sequentially formed on the first insulating substrate 101 on which the m-th data line DLm, the semiconductor pattern SM, the source electrode SE, and the drain electrode DE are formed. Then, the photoresist layer is exposed and developed to form the photoresist layer pattern. The first and second conductive metal oxide layers are substantially simultaneously patterned using the photoresist layer pattern as the mask, thus forming the pixel electrode PE. The fourth photolithography process is similar to the third photolithography process described in the first embodiment.

The protective layer 113 is formed on the first insulating substrate 101 on which the pixel electrode PE is formed.

The first substrate 100 manufactured by the above-mentioned processes is coupled with the second substrate 200 on which the color filters CF of FIG. 1 are formed. The liquid crystal layer 300 is formed between the first substrate 100 and the second substrate 200. As described above, according to the second embodiment, the first substrate 100 may be manufactured by four photolithography processes using four masks, thereby preventing defects due to the reduction of indium.

In the first and second embodiments, the methods of manufacturing the PLS mode display apparatus have been shown. However, the process of performing the plasma-treatment after forming the pixel electrode PE may be applied to display apparatuses having other structures.

Figure 9:
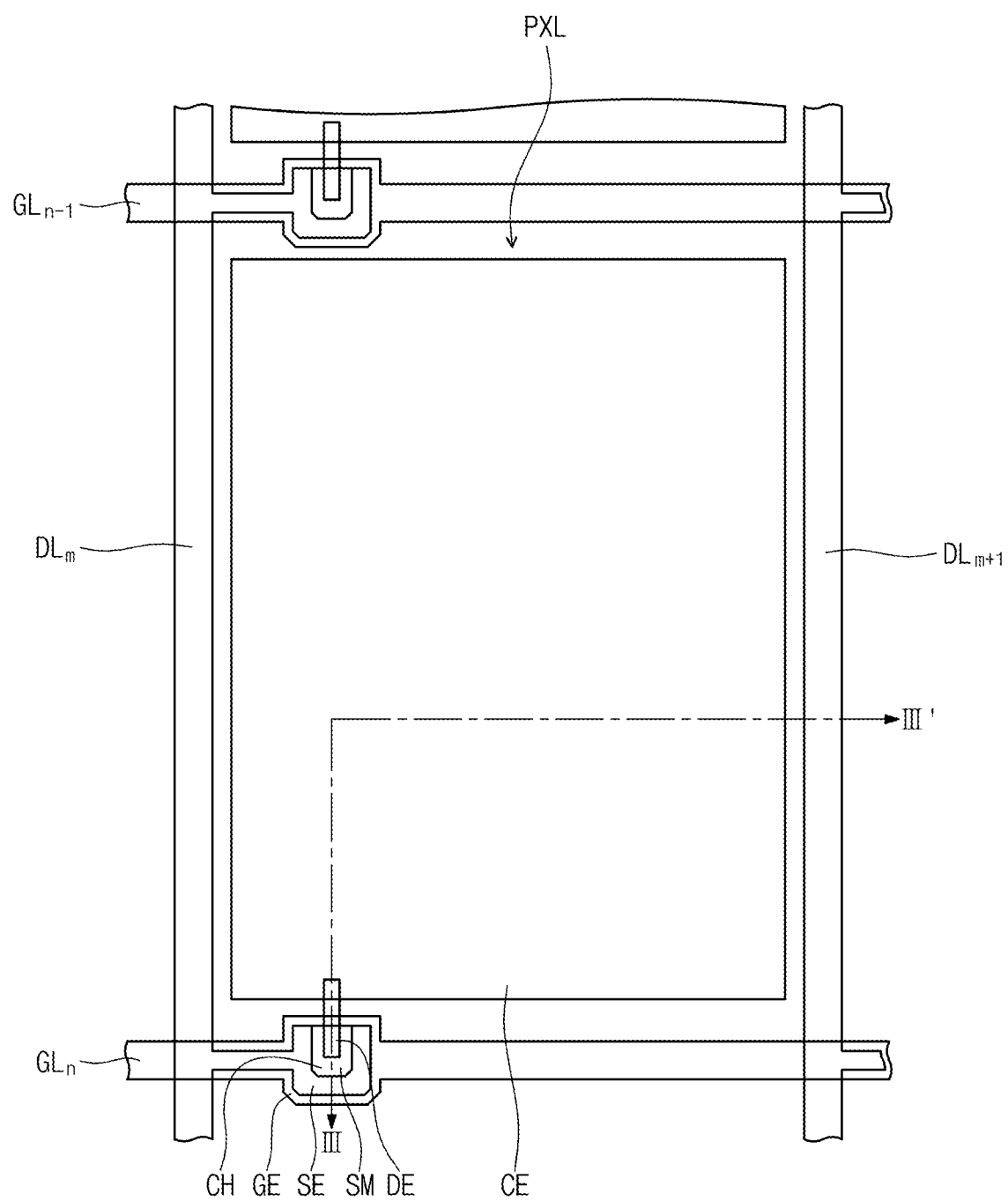
FIG. 9 is a plan view showing a portion of a display apparatus manufactured by a manufacturing method of the display apparatus according to a third embodiment of the present invention.
Figure 10:
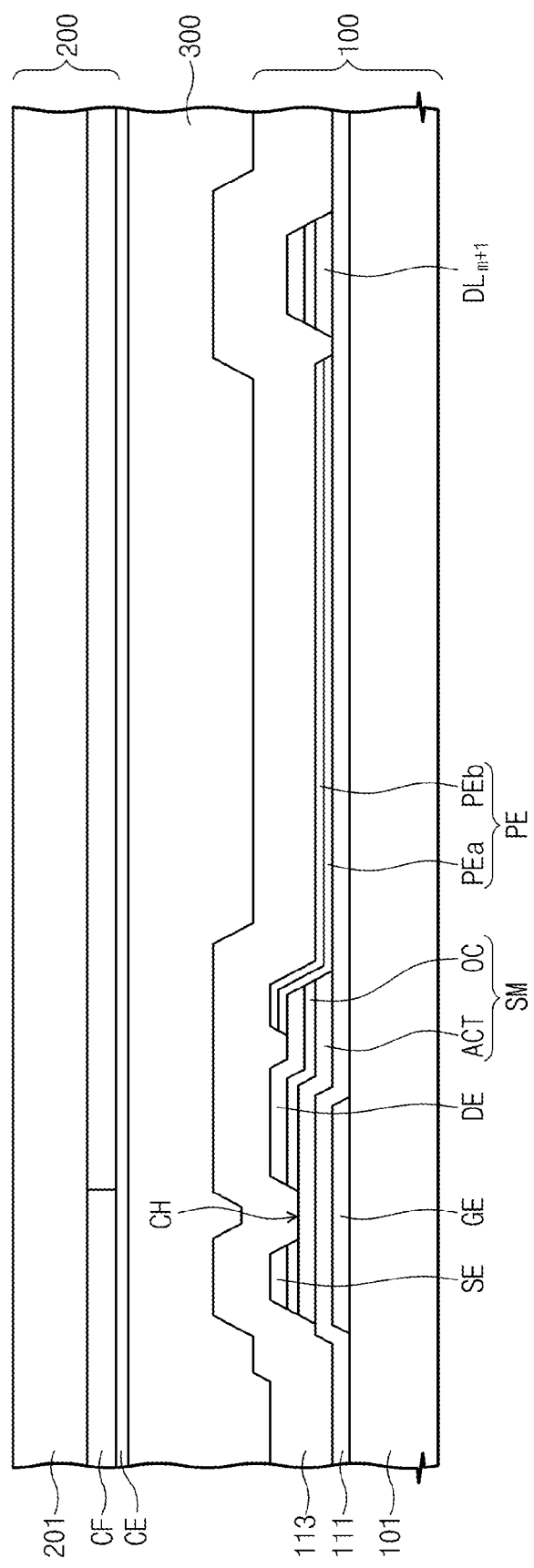
FIG. 10 is a cross-sectional view taken along a line III-III' shown in FIG. 9.

FIG. 9 is a plan view showing a portion of a display apparatus manufactured by a manufacturing method of the display apparatus according to a third embodiment of the present invention, and FIG. 10 is a cross-sectional view taken along a line III-III' shown in FIG. 9. In FIGS. 9 and 10, the same reference numerals denote the same elements in FIGS. 1 and 2, and thus detailed descriptions of the same elements will be omitted.

Referring to FIGS. 9 and 10, the display apparatus includes the first substrate 100, the second substrate 200 facing the first substrate 100, and the liquid crystal layer 300 interposed between the first substrate 100 and the second substrate 200. Each pixel PXL includes the thin film transistor, the pixel electrode PE connected to the thin film transistor, the protective layer 113 covering the pixel electrode PE, and the common electrode CE spaced apart from the pixel electrode PE. The thin film transistor includes the gate electrode GE, the gate insulating layer 111, the semiconductor pattern SM, the source electrode SE, the drain electrode DE.

In the present embodiment, the n-th gate line GLn, the gate electrode GE, the gate insulating layer 111, the semiconductor layer, the m-th data line DLm, the source electrode SE, the drain electrode DE, the pixel electrode PE, and the protective layer 113 have substantially the same structure and function as those described in the first embodiment.

The second substrate 200 includes the second insulating substrate 201, the color filters CF formed on the second insulating substrate 201, and the common electrode CE formed on the color filters CF.

The common electrode CE forms an electric field together with the pixel electrode PE of the second substrate 200 to drive the liquid crystal molecules in the liquid crystal layer 300.

According to the third embodiment, the first substrate 100 may be manufactured by first to third photolithography processes using three masks, and the first, second, and third photolithography processes are the same as the first, second, and third photolithography processes described in the first embodiment. In the third embodiment, the process of forming the common electrode CE is additionally performed when the second substrate 200 is formed.

As described above, precipitation of indium on the pixel electrode PE may be prevented, to thereby prevent defects due to the reduction of indium.

Although the aforementioned embodiments use liquid crystal display as an example of a display apparatus, the thin film transistor substrate is not limited to being used with liquid crystal displays. That is, the thin film transistor substrate according to the embodiments of the present invention may be used for various display apparatuses, such as an organic light emitting display (OLED), an electrophoretic display (EPD), a plasma display panel (PDP), a microelectromechanical system (MEMS), and so on.

Although embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A display apparatus comprising:
   a first insulating substrate;
   a second insulating substrate facing the first insulating substrate; and
   a plurality of pixels disposed on the first insulating substrate, each pixel comprising:
   a gate electrode disposed on the first insulating substrate;
   a gate insulating layer disposed on the first insulating substrate to cover the gate electrode;
   a semiconductor pattern disposed on the gate insulating layer to overlap with the gate electrode;
   a source electrode disposed on the semiconductor pattern;
   a drain electrode disposed on the semiconductor pattern to be spaced apart from the source electrode;
   a transparent pixel electrode comprising a first pixel electrode disposed on the gate insulating layer and partially making contact with the drain electrode and a second pixel electrode covering the first pixel electrode; and
   a common electrode disposed on the first insulating substrate or the second insulating substrate to form an electric field together with the pixel electrode, wherein the first pixel electrode comprises a transparent conductive oxide layer containing indium and the second pixel electrode comprises a transparent conductive oxide layer not containing indium,
   wherein the second pixel electrode comprises a dopant containing at least one of aluminum, germanium, or gallium, and
   the dopant concentration in the second pixel electrode is about 5 weight percent or less of the metal oxide.

2. The display apparatus of claim 1, wherein the first pixel electrode and the second pixel electrode comprises at least one of tin or zinc.

3. The display apparatus of claim 1, wherein each of the source electrode and the drain electrode has a single-layer structure or a multi-layer structure comprising nickel, chromium, molybdenum, aluminum, titanium, copper, tungsten, or an alloy thereof.

4. The display apparatus of claim 3, wherein each of the source electrode and the drain electrode comprises titanium and copper.

5. The display apparatus of claim 1, further comprising a protective layer to cover the pixel electrode, wherein the common electrode is disposed on the protective layer.

6. The display apparatus of claim 5, wherein the common electrode comprises a main branch portion and a plurality of sub-branch portions protruding from the main branch portion and spaced apart from each other.

7. The display apparatus of claim 1, wherein the common electrode is disposed between the first insulating substrate and the gate insulating layer and insulated from the gate electrode.

8. The display apparatus of claim 7, wherein the pixel electrode comprises a main branch portion and a plurality of sub-branch portions protruding from the main branch portion and spaced apart from each other.

9. The display apparatus of claim 1, wherein the common electrode is disposed on the second insulating substrate.

10. A display apparatus comprising:
    a first insulating substrate;
    a second insulating substrate facing the first insulating substrate; and
    a plurality of pixels disposed on the first insulating substrate, each pixel comprising:
    a gate electrode disposed on the first insulating substrate;
    a gate insulating layer disposed on the first insulating substrate to cover the gate electrode;
    a semiconductor pattern disposed on the gate insulating layer to overlap with the gate electrode;
    a source electrode disposed on the semiconductor pattern;
    a drain electrode disposed on the semiconductor pattern to be spaced apart from the source electrode;
    a transparent pixel electrode comprising a first pixel electrode disposed on the gate insulating layer and partially making contact with the drain electrode and a second pixel electrode covering the first pixel electrode; and
    a common electrode disposed on the first insulating substrate or the second insulating substrate to form an electric field together with the pixel electrode, wherein the first pixel electrode comprises a transparent conductive oxide layer containing indium and the second pixel electrode comprises a transparent conductive oxide layer not containing indium, wherein the second pixel electrode has an electric resistance higher than the first pixel electrode, and
    the first pixel electrode is thinner than the second pixel electrode.

* * * * *